Oct. 2, 1934. W. RIESELER ET AL 1,975,124
AIRCRAFT
Filed Aug. 30, 1930  3 Sheets-Sheet 3
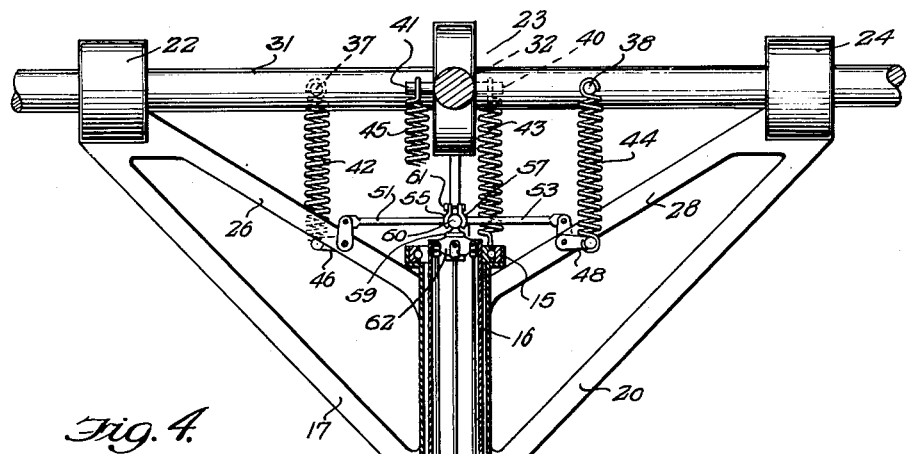
Fig. 4.
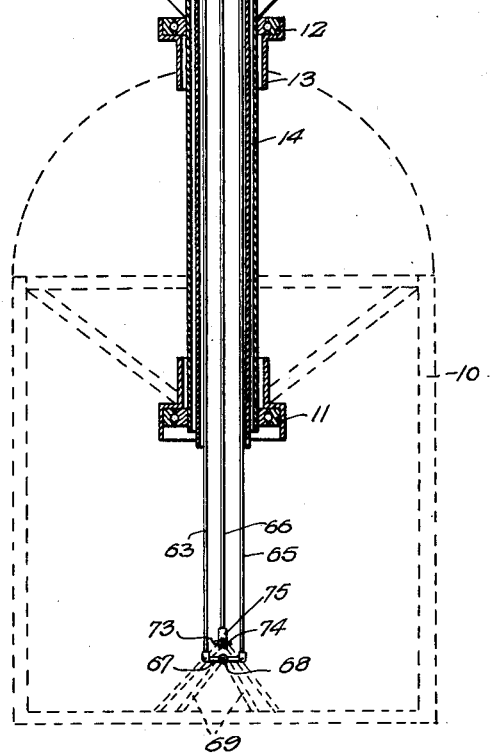
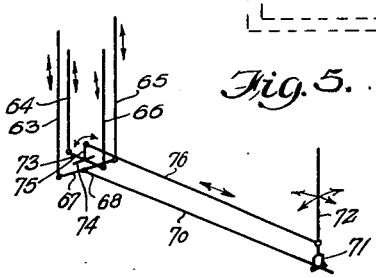
Fig. 5.
Inventor
Walter Rieseler and
Walter Kreiser.
By Frank H. Borden
Attorney Patented Oct. 2, 1934

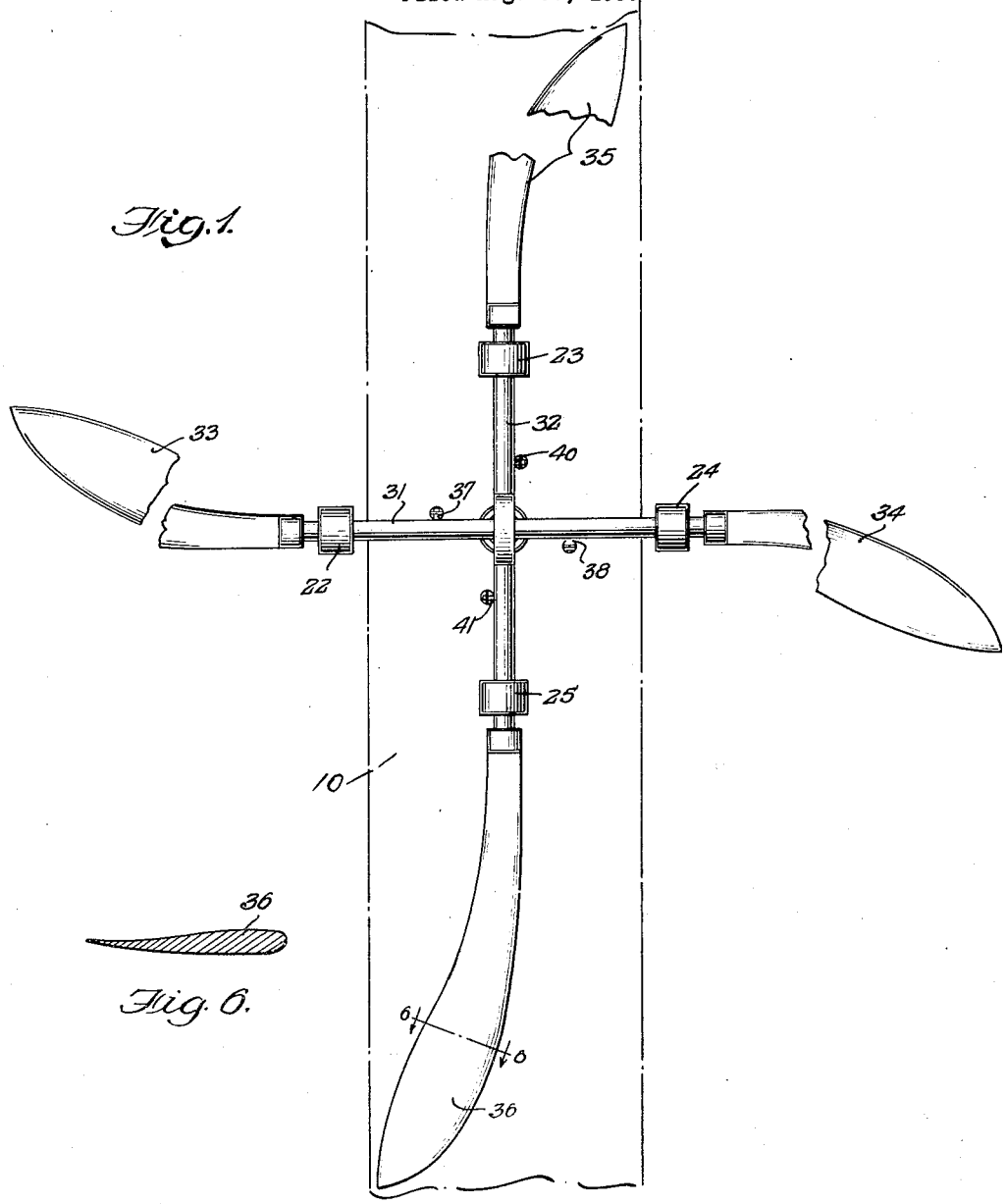

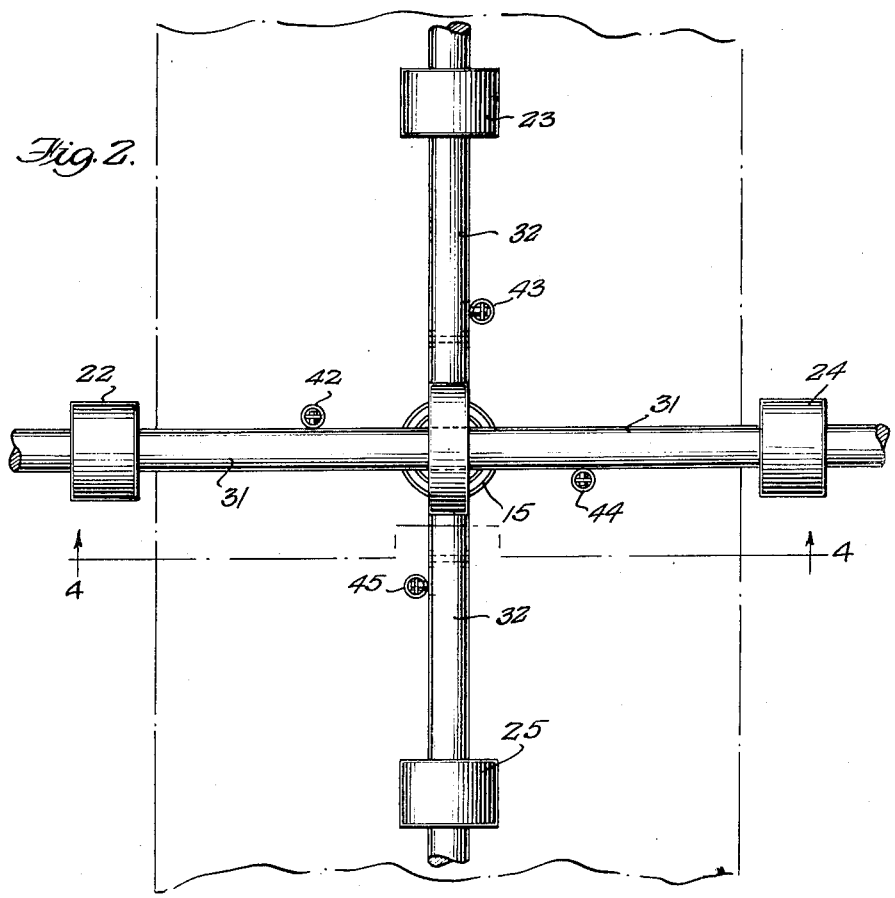
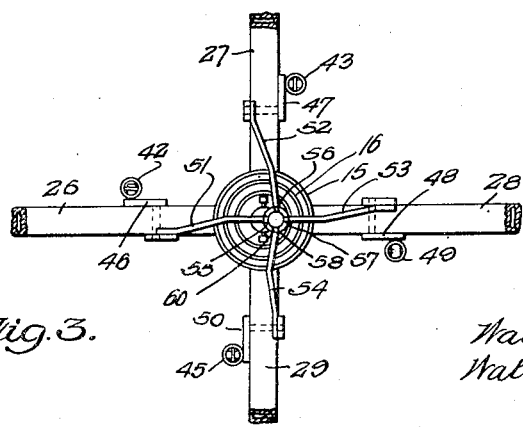

1,975,124

UNITED STATES PATENT OFFICE 1,975,124

AIRCRAFT

Walter Rieseler and Walter Kreiser, Keyport, N. J., assignors to Edward Burke Wilford, Philadelphia, Pa.

Application August 30, 1930, Serial No. 479,037

20 Claims. (Cl. 244—19)

This invention relates to aircraft, and particularly to sustaining devices therefore of the rotating wing system type.

In our application Ser. No. 159,848, filed January 8, 1927, now Patent No. 1,777,678 issued October 7, 1930 we disclosed a novel sustaining device of the type, in which the blades of the rotor were mounted rigidly upon two transversely disposed shafts, and arranged to equalize the lift on each end of the respective shafts through oscillation of the shafts under aerodynamic action.

The instant invention relates generally to improvements in rotating wing systems and particularly to improvements on the device disclosed in the application above identified.

The problem in aerodynamically actuated rotors of this type is to secure equalization of the lift on opposite sides of the rotor so that equilibrium is maintained. It is complicated by the fact that of each pair of blades one is turning into the head wind, while the other is moving with that wind. The result is, if the blades are fixed, that there is much greater lift derived from the blade going into the head wind than from that which is going with that wind. With the arrangement disclosed in the application above noted the lift is equalized through the mere existence of a differential lift. In other words greater lift on one blade causes the blade to exert a turning moment on the shaft to reduce the angle of incidence of the said blade to reduce its lift, while simultaneously increasing the angle of incidence of the opposite blade of the pair to increase its lift. The result is equilibrium. While this is for most purposes quite effective we have found that under certain conditions the turning moment on the shaft is so strong that it goes too far, through inertia, and presents too great an angle of incidence on the opposite blade of the pair, this sometimes presents forces of unbalance and causes vibrations that are undesirable. The first object of the invention, therefore, is to improve upon the original construction by providing damping devices to limit the oscillations of the spars or shafts, so as to damp or quench vibrations and unbalance but not to destroy the equilibrating effect.

In aircraft as previously constructed, and especially in airplanes having rotatable sustaining elements, it has always been necessary heretofore to provide small or large auxiliary fixed wings, for their sustaining qualities, as well as to provide supports for lateral stabilizers or ailerons. It has also been necessary heretofore to provide in addition to the ailerons a horizontal stabilizer and a horizontal elevator to secure both lateral and longitudinal stability and control. The provision of these elements and devices has involved complications, extra weight and extra head resistance. It is an object of this invention to provide an aircraft having both lateral and longitudinal control and stabilization by appropriate control of the rotatable sustaining element, so that the auxiliary fixed wings, ailerons, and stabilizers may be obviated if desired. It is a further object to provide an aircraft having a rotatable sustaining element in which the effective lift from the element is under the control of the operator so that both longitudinal and lateral stability is obtained without the use of ailerons and elevators.

In the accompanying drawings:

Fig. 1 represents a top plan of the rotatable sustaining element partially broken away, Fig. 2 represents a fragmentary plan on a slightly enlarged scale, Fig. 3 represents a fragmentary plan partially in section, Fig. 4 represents a vertical section through the invention taken on line 4—4 of Fig. 2, Fig. 5 represents a diagrammatic perspective of the operating mechanism of the invention, and Fig. 6 represents a vertical section through a blade taken on line 6—6 of Fig. 1.

In Fig. 1 of the accompanying drawings, the fuselage is indicated in dotted lines as 10. The fuselage will be suitably trussed and form a rigid support for a ball or other bearing 11, preferably, although it is contemplated that if desired for any purpose the bearings will be adjustable relative to the rigid trussing so as to permit variations in the vertical disposition of the shaft forming the axis of the rotor, to be described. In the illustrative form disclosed the bearing 11 is rigid.

A second bearing in substantial vertical alignment with the first is shown at 12, at the upper part of a trussed extension of the fuselage, as 13. A tubular shaft 14 carrying the rotor of the aircraft and forming the vertically extending axis thereof is journalled in the bearings 11 and 12, and at its upper end recessed to receive a ball bearing 15 or the like. The tubular shaft is arranged for rotation in the bearings with the rotor to be described, and may be prolonged beneath the lower edge of the bearing 11, or otherwise modified, so as to carry one element of a transmission or drive assembly to initiate the rotation of the rotor. (Not shown.)

The upper bearing 15 has its inner ball race attached to a secondary tubular shaft or guide tube 16, suspended from bearing 15, and substantially concentrically disposed within the shaft 14. Shaft or guide 16 is stationarily mounted and may be anchored or otherwise affixed at the lower end to a desired part of the fuselage, leaving clearance for the insertion of the control devices to be described.

Just above the second or intermediate bearing 12, a series of upwardly and outwardly extending arms, respectively, 17, 18, 20 and 21, are radially arranged in rigid engagement or integrality with the tube or shaft 14 to turn with the said shaft. The arms are preferably diametrically disposed in pairs, with their outer ends terminating in housings for bearings as respectively shown at 22, 23, 24, and 25. Roller or ball bearings of any desired sort are disposed in the housings to receive the transverse shafts to be described. Rigidly connected with the respective bearing housings are the secondary arms, respectively, 26, 27, 28 and 30, which merge into or are attached to the upper end of the vertical shaft 14 just below the upper bearing 15. This assembly provides a rigid and substantially inflexible support for the vane or wing elements to be described. It might be noted that the primary and secondary arms may be of any desired construction, but in the interests of lightness without sacrificing strength, it is preferred that the arms comprise tubing.

The wings of the aircraft preferably are four in number, and comprise blades of substantially airfoil contour arranged in pairs at the opposite ends of shafts journalled in bearings in the housings at the ends of the arms. Thus there will be a shaft 31 rotatably or oscillatably mounted in the bearings in housings 22 and 24, and a shaft 32, substantially perpendicular to shaft 31, will be mounted for oscillation in the bearings in housings 23 and 25. Shaft 31 will carry at the respective ends of the shaft blades 33 and 34, while shaft 32 will carry blades 35 and 36. Each pair of blades is so disposed that the center of pressure of the blade is rearwardly off-set from the axis of oscillation, which passes through the blades longitudinally and substantially concentric with the bearings in the housings. As will be understood, the blades of a pair are given an angular setting relative to each other such that as the rotor rotates about the vertical axis the differential lift normally derived from the fact that one blade of a pair travels into the airstream while the opposite blade is traveling with the air stream, is obviated through oscillation of the shaft connecting each pair so as to secure equalization of lift through differential angles of incidence. The unequal torque imposed on the shaft by each blade of a pair, being opposite from each blade, will move the shaft about its axis in the bearings until the torques are balanced. This will be understood by reference to the application above identified.

It having been determined that under certain conditions the inertia of the respective horizontal shafts may be such as to set up or establish turning moments, it is found desirable to damp or quench excessive oscillations of the respective shafts.

For this purpose it has been found expedient to subject each shaft to the resilient pull of a damping device, such for instance as by providing a spring on each side of a shaft such that oscillation of the shaft in either direction is resiliently opposed by the opposite spring. The springs are not of such strength as to interfere with the oscillation under aerodynamic action, but simply tend to build up a resistance to movement as the oscillation continues so as to damp or quench undesired rolling moments.

For this purpose each shaft is provided with two diametrically spaced lateral projections such as ears on opposite sides of the shaft. Thus shaft 31 has an ear 37 on one side of the shaft and on one side of the vertical axis, and another ear 38, on the opposite side of the shaft and on the other side of the vertical axis. Of course except as the question of balance must be considered it is not essential that these ears be longitudinally spaced, but may be diametrically disposed on the shaft. The other shaft, 32, has similar, oppositely disposed lugs or ears 40 and 41.

To each ear a substantially vertically disposed tension spring is affixed, respectively numbered 42, 43, 44 and 45, which may have their lower ends attached in a fixed position to a convenient portion of the arm assembly of the rotatable support. It is preferred, however, that the lower ends of each spring be pivotally connected to the ends of bell crank levers, respectively, 46, 47, 48 and 50. The bell crank levers are pivoted to a fixed portion of the rotating arm assembly and are each respectively pivotally connected to the substantially radially extending substantially horizontal links, respectively, 51, 52, 53 and 54, the clustered inner ends of which have each a flange forming a cupped end or concavity, as at 55, 56, 57, and 58, respectively, in abutting engagement with a ball 60, and which abutting engagement is maintained by a clamping ring 61 engaging all of the flanges on the links as will be clear.

The ball 60 is preferably mounted on a short shank 59, rotatably mounted in a bearing vertically mounted in the upper surface of a floating element 62 which is stationary in contrast to the rotatability of the remaining elements of the assembly. The floating element is arranged for inclination in any direction so as to cause substantially horizontal movements of the ball, and thus of the links connected thereto. The floating element is preferably arranged to have universal movement to cause eccentric positioning of the ball relative to the vertical axis of the tubular shaft 14. An illustrative manner of securing this result is by providing four substantially vertical links, respectively 63, 64, 65, and 66 housed in the stationary tube 16, and pivoted to the floating elements substantially radially of the vertical axis thereof. If it is desired that the ball be movable laterally only, instead of laterally and longitudinally as shown, it will be clear that this result may be easily achieved by simply providing two of the links, such as 63 and 65, while supporting the floating element on trunnions or the like, (not shown) engaging the upper end of the tube 16 radially of the axis in the position of the upper ends of the other links 64 and 66. This would enable the pilot to move the ball in one plane only, instead of the infinite number available from the instant invention.

The vertical links are considered in pairs, and it will be observed that the elevation of one link of a pair, and a consequent lowering of the other link of the pair will cause the floating element to assume an inclined position in the tube 16. This moves the ball in one direction. If the other pair of links are similarly actuated, the ball will have a resultant movement combined of both inclining functions as will be clear.

The operation of the device will be obvious from consideration of the principles underlying this type of rotating wing system. The blades are each given a slight initial positive angle of incidence, and therefore an initial angular shaft setting in the bearings on the arm assembly. Normally, without springs as shown in this invention, the aerodynamic rotation of the rotor in a moving air stream, with the axis of rotation being substantially vertical, results in the blade going into the air stream having a greater lift than the opposite blade on the shaft moving with the air stream, and through the fact that the center of lift on each blade is rearwardly offset, opposite but unequal torques are applied to the shaft. This normally causes oscillation of the latter blade, with a decrease in the angle of incidence of the former. As noted it sometimes happens that the inertia of the shaft and blades in the bearings on the assembly is such that having started an oscillation of the shaft due to the unequal torque, the shaft tends to continue the movement and the rolling moment both increases the angle of incidence of one blade too far, but also decreases the angle of incidence of the other blade. The effects are somewhat cumulative, as, thereafter with the abnormal blade settings thus established the rolling moments are even more pronounced owing to the lever action of the exaggerated lift components on the axis of oscillation of the shaft. Such excess rolling causes certain undesirable effects such as vibration and instability or lack of equilibrium.

With the springs of this invention, or such modifications thereof as may occur to those skilled in the art, and with the initial setting of the ball 60 in a position concentric with the axis of the tubular shaft 14, then each spring of a pair will exert the same tension on the shaft so that the shaft is balanced and the initial setting both of the blades and of the shaft to which they are attached is resiliently maintained. Thus as the rotor rotates and the blades begin to react to the aerodynamic influences the excess lift derived from one blade imposes such torque on the shaft as will urge it to oscillate as before to change the settings of each blade relative to the plane of rotation. However, as the oscillation of the shaft begins, it is resiliently opposed by the increasing tension of the spring which is fixed by the oscillation. The angular change of the blade in responding to the excess lift is checked resiliently, however, as soon as there is substantial equalization of the lift derived from each blade of a pair, so that excess rolling moments are so sharply reduced as to be negligible. The whole action of the rotor is smoother and vibration is substantially precluded. This may be described as the damping function and is of importance of itself.

The invention herein, however, goes beyond the mere damping, important as that is, as by the means disclosed, or the obvious modifications thereof such as will be apparent to those skilled in the art, it is contemplated that the lateral or longitudinal stabilizing of the aircraft, or both, may be achieved.

Let us consider that the rotor is stationary. Then movement of the ball by any desired means, such as that to be further described, laterally of the axis of rotation of the tubular shaft 14, as to the right in Fig. 3, while having no appreciable effect upon links 52 and 54, will pull link 51 to the right thus swinging the bell crank lever 46 to relieve the tension on spring 42, and simultaneously will push link 53 to the right, swinging bell crank lever 48 on its pivot to increase the tension on spring 44. The effect, obviously, is to change the initial angular setting of the shaft and thus to change the respective angles of incidence of the blades. This establishes a new angular setting for the shaft as a position of equilibrium as to the opposed forces of the springs. It will be apparent that such change of spring tension simply varies the angular position of the shaft at which the tension of the spring tends to overcome the torque from the excess lift of a blade. If the springs are of suitable strength it will be apparent that although there will be the same range of oscillation under the new setting of the ball 60 as there is at the old setting in a position of concentricity, yet there will be a point at which although there is still an excess of lift on one blade of a pair, the tension of the spring has been so increased as to prevent further oscillation of the shaft. When this condition is attained it will be seen that the excess of lift will be focused at one side of the rotor, and thus a tilting moment is set up which if controllable by the pilot may be used for stabilizing purposes. This is a further factor in this invention, as the structure provided enables the lateral movement of the ball 60 in any desired radial direction so as to secure a controllable tilting moment focused at any desired point in the path of rotation of the rotor.

It may be desirable to have a "lead" upon the rotor in the sense that there may be a lag in the response of the rotor to controlling actions. Thus if it is desired to exert a focal point of lift in lateral alignment with the arm 20, for instance, it might be desirable to position the ball 60 in advance of that arm in the direction of rotation so that by the time the rotor blade could respond to the deflecting or controlling action of the springs it would become evident at the point desired.

During the rotation of the rotor with the ball 60 moved to any position of eccentricity desired, it will be evident that the links 51, 52, 53, and 54 will be moving constantly radially substantially, of the axis of the tubular shaft 14.

The vertical links are disposed slidably in the stationary tube 16, and terminate below the tube. It is preferred that the links of one pair, such for instance at 63 and 65, be a little longer than those of the other pair, as 64 and 66, so that the terminals of one pair are vertically spaced from the terminal of the other pair to allow clearance for the actuating elements. Links 63 and 65 are held in laterally spaced relation at their lower ends by the lever 67, to which they are each pivotally connected. Lever 67 is mounted on a transverse bearing 68, suitably mounted on truss 69 to support the lever for oscillation about the bearing 68. Keyed to lever 67, is a shaft 70 pivotally connected to the yoke 71, rigidly connected to the lower end of a control stick or other control element 72. The arrangement is such that lateral movement of the stick causes oscillation of the shaft 70 about its longitudinal axis, which in turn causes lever 67 to swing in the bearing 68, and elevate one end of the lever while simultaneously and equally lowering the other end of the lever. Obviously such movement of the lever 67 causes one vertical link, of the pair, as 63 to be elevated while the other link 65 is lowered, which causes angular change of position of the floating element and lateral movement of the ball carried thereby.

The other pair of vertical links are similarly connected with a transverse lever 73, pivoted on the cross pin 74, and having the upstanding rigid arm or link 75 connected to tie rod or link 76 which latter is pivotally connected to the control stick 72, and responsive to fore and aft movements of said stick. It will be observed that with the linkage tying up the floating element and the control stick, the pilot may exercise all of the controlling movements customary with ordinary aircraft, but which controlling function is exercised with the rotatable sustaining element itself.

It will be obvious that the particular mode of transmitting controlling actions to the blades of the rotor is subject to wide modification according to the necessities of the installation and it is only of importance that some means be provided to affect the tension of the damping mechanism.

We claim:

1. In gyroplanes, an aerodynamically rotatable support, a pair of arcuately spaced blades of airfoil section each extending radially of the support and pivoted respectively on axes of oscillation extending substantially longitudinally of and through the respective blades but with each blade so disposed as to cause the center of lift of the blade to be rearwardly offset from the axis of oscillation of said blade, means operatively associated with each blade whereby the angle of incidence of each blade is simultaneously varied by aerodynamic action, and means for resiliently damping the oscillation of each blade.

2. In gyroplanes, an aerodynamically rotatable support, a pair of arcuately spaced blades of airfoil section each extending radially of the support and pivoted respectively on axes of oscillation extending substantially longitudinally of and through the respective blades but with each blade so disposed as to cause the center of lift of the blade to be rearwardly offset from the axis of oscillation of said blade, means operatively associated with each blade whereby the angle of incidence of each blade is simultaneously varied by aerodynamic action, means for resiliently damping the oscillation of each blade, and means for controlling the resilient damping means to cause one blade to exert a greater lift than the other.

3. In aircraft a freely rotatable sustaining element of the gyroplane type, a shaft journaled on the element, airfoils rigidly mounted axially of and on the shaft and rotatable bodily with the shaft in a fixed path with the greatest area of each airfoil lying behind the axis of the shaft so that lifting pressure on either blade imposes torque on the shaft, each blade having initially a slight positive angle of incidence relative to the path of rotation and being so arranged that the positive angle of incidence of one airfoil is increased as the shaft responds to the torque imposed by the other blade as lifting pressure moves said other blades to decrease its positive angle of incidence toward a negative angle of incidence under aerodynamic action to equalize the effective lift of both airfoils, and means to damp the oscillations of said shaft.

4. In aircraft a freely rotatable sustaining element of the gyroplane type, a shaft journaled on the element, airfoils rigidly mounted axially of and on the shaft and rotatable bodily with the shaft in a fixed path with the greatest area of each airfoil lying behind the axis of the shaft so that lifting pressure on either blade imposes torque on the shaft, each blade having initially a slight positive angle of incidence relative to the path of rotation and being so arranged that the positive angle of incidence of one airfoil is increased as the shaft responds to the torque imposed by the other blade as lifting pressure moves said other blade to decrease its positive angle of incidence toward a negative angle of incidence under aerodynamic action to equalize the effective lift of both airfoils, and means operable by the pilot of the aircraft to prevent the equalization of the effective lift of both airfoils.

5. In gyroplanes, an aerodynamically rotatable support, a plurality of blades rotatable with the support, means connecting certain blades to simultaneously but oppositely vary their respective angles of incidence under aerodynamic action, and manual means for effecting a desired differential lift between certain of the blades.

6. In gyroplanes, a rotatable support, spaced bearings on the support, a shaft journaled in the bearings, blades mounted on opposite ends of said shaft, a spring device operatively associated with the shaft and the support to damp the oscillations of said shaft.

7. In gyroplanes, a rotatable support, spaced bearings on the support, a shaft journaled in the bearings, blades mounted on opposite ends of said shaft, a spring device operatively associated with the shaft and the support to damp the oscillations of said shaft, and means to vary the condition of the spring device so as to change the normal spring controlled angular disposition of said shaft.

8. In gyroplanes, a rotatable support, a shaft journalled transversely of the axis of the support, blades mounted on opposite ends of the shaft arranged to oscillate the shaft to equalize the effective lift of each blade under aerodynamic action, a spring device mounted on the support and operatively engaged with a blade, to damp the oscillations of the blade in one direction.

9. In a normally aerodynamically driven rotor system, a blade, means for supporting the blade, said blade mounted to rotate about an axis substantially normal to the substantial plane of rotation under aerodynamic action and to feather on an axis lying in the plane of rotation of said blade between limits, and means for relatively changing the limits of feathering to vary the amount of feathering and the point of beginning of the feathering of the blade while the blade is moving aerodynamically in its substantial plane of rotation.

10. In gyroplanes, a rotatable support, a shaft journalled transversely of the axis of the support, blades mounted on opposite ends of the shaft arranged to oscillate the shaft to equalize the effective lift of each blade under aerodynamic action, a spring device mounted on the support and operatively engaged with a blade, to damp the oscillations of the blade in one direction, a second spring device operatively associated with the blade to damp the oscillations of the blade in the opposite direction, and means operable to vary the condition of a spring device to change the initial setting of such blade.

11. In a gyroplane, a blade, means for supporting the blade for oscillation on an axis lying in the plane of rotation of said blade, said blade arranged for oscillation under aerodynamic action from a given normal angular setting to a second operated angular setting, and means for changing the normal angular setting while the blade is moving in its plane of rotation.

12. In aircraft of the gyroplanes type a fuselage, a tubular shaft journaled on the fuselage, a rotatable support carried by the tubular shaft, movable elements on said support, shafts journalled for oscillation on the support transverse to the axis of the tubular shaft, blades mounted on the shafts and the blades respectively arranged to oscillate the respective shafts to equalize the lift of opposite blades, spring devices operatively associated with the respective shafts and with the respective movable elements, and means housed in the tubular shaft and operatively engaging the movable elements to vary the condition of the spring devices to prevent equalization of the lift of opposite blades to secure stabilizing functions.

13. In gyroplanes, a support rotatable on an axis, a shaft journalled on the support and having an axis of oscillation, blades mounted on opposite ends of said shaft and so disposed as to secure aerodynamic rotation of the system comprised of the blades, shaft and support, an arm mounted on the shaft, a bell crank lever pivoted on the support, means for pivotally moving the bell crank lever, and a connection between said lever and said arm whereby desired oscillations of the shaft may be secured in response to actuations of said lever.

14. In gyroplanes, a support rotatable on an axis, a shaft journalled on the support and having an axis of oscillation, blades mounted on opposite ends of said shaft and so disposed as to secure aerodynamic rotation of the system comprised of the blades, shaft and support, a lug extending radially of the shaft, a bell crank lever pivoted on the support and having an end substantially below the lug, means positionable eccentrically relative to the axis of the support, a link engaging an end of said bell crank and operatively associated with said last mentioned means, and means connecting the first mentioned end of the bell crank with said lug.

15. In gyroplanes, a support rotatable on an axis, bearings on the support spaced from the axis, a shaft having an axis and journalled in bearings and extending substantially radially of the first mentioned axis, a blade mounted on each end of the shaft, each blade having such angular setting as to secure aerodynamic rotation of the support, a lever pivotally mounted on the support, a link pivoted to the lever, means positionable eccentrically relative to the first mentioned axis and operatively associated with the link, means defining a lever arm on the shaft and disposed between the first mentioned axis and a bearing, a connection between the last mentioned means and said lever, and means for varying the position of the positionable means and hence of the shaft and thus simultaneously changing the angular setting of each blade.

16. In gyroplanes, a rotatable support, a shaft journaled on the support transversely of the axis of the support, blades mounted on opposite ends of the shaft arranged to rotate the support by aerodynamic action, and said blades and shaft arranged for oscillation as a unit and subjected to oscillating torque in response to differential lift on said blades, means operatively associated with a blade to variably control the oscillation of the unit in one direction.

17. In gyroplanes, an aerodynamically rotatable support, a pair of arcuately spaced blades of airfoil section each extending substantially radially of the support and pivoted respectively on substantially radial axes of oscillation with each blade so disposed as to cause the center of lift of the blade to be offset from the said axis of oscillation of said blade, means operatively associated with each blade whereby the angle of incidence of each blade is simultaneously urged toward variation by aerodynamic action, and means for manually controlling the oscillation of each blade selectively in accordance with or in contravention of said urge.

18. In aircraft a freely rotatable sustaining element of the gyroplane type, a shaft journaled on the element, airfoils rigidly mounted axially of and on the shaft and rotatable bodily with the shaft in a substantially fixed path with the center of pressure of each airfoil lying behind the axis of the shaft so that lifting pressure on either blade imposes torque on the shaft, each blade having initially a lift producing angle of incidence relative to the path of the relative wind and being so arranged that the angle of incidence of one airfoil is increased as the shaft responds to the torque imposed by the other blade as lifting pressure moves said other blade to decrease its angle of incidence under aerodynamic action to equalize the effective lift of both airfoils, and means operable by the pilot of the aircraft to prevent the equalization of the effective lift of both airfoils.

19. In gyroplanes, a rotatable support, a shaft journaled transversely of the axis of the support, blades mounted on opposite ends of the shaft arranged to oscillate the shaft to equalize the effective lift of each blade under aerodynamic action, a device mounted on the support and operatively engaged with a blade to control the oscillations of the blade in one direction during rotation.

20. In a gyroplane, a blade, means for supporting the blade, said blade mounted to rotate about an axis normal to the plane of rotation under aerodynamic action and to oscillate on an axis lying in the plane of rotation of said blade from a given normal angular setting to a second operated angular setting during a cycle of rotation, and means for changing the normal angular setting while the blade is moving in its plane of rotation.

WALTER RIESELER.
WALTER KREISER.